Oct. 28, 1958 R. H. ABPLANALP Re. 24,555

DISPENSING CAP FOR AEROSOLS

Original Filed Oct. 31, 1956

INVENTOR
ROBERT H. ABPLANALP
BY
Cornelius Zabriskie
ATTORNEY

United States Patent Office

Re. 24,555
Reissued Oct. 28, 1958

24,555

DISPENSING CAP FOR AEROSOLS

Robert H. Abplanalp, Bronxville, N. Y., assignor of one-half to John J. Baessler, Bronxville, N. Y.

Original No. 2,819,116, dated January 7, 1958, Serial No. 619,621, October 31, 1956. Application for reissue May 28, 1958, Serial No. 738,591

5 Claims. (Cl. 299—95)

Matter enclosed in heavy brackets [ ] appears in the original patent but forms no part of this reissue specification; matter printed in italics indicates the additions made by reissue.

This invention is a dispensing cap for aerosols and is adapted to be used primarily with aerosol dispensers, wherein the material to be dispensed is discharged from a container through the hollow valve stem of an associated valve, such as shown in my Patent No. 2,631,814, granted March 17, 1953. This valve is supported on a cup adapted to act as a closure to an open top container which normally contains said material.

There are two principal kinds of valve operating members in present day use. One is of the type exemplified by my Patent No. 2,631,814, wherein the upper end of the valve stem carries a nozzle button adapted to be directly actuated by finger pressure of the operator. The other is of the type wherein an elastic diaphragm, carried by a cap, overlies the upper end of the valve stem and is adapted to be pressed by the operator against said stem to depress the latter and open the valve. My Patent No. 2,753,214 of July 3, 1956, is of the latter type. In that patent, the cap is formed from some appropriate resilient material, such as a polyethylene plastic adapted to be permanently mounted on the cup of the container and provided with an elastic diaphragm overlying the valve stem and having a chambered hub in which the upper end of the valve stem is seated. A passage leads from the chamber in the hub to a spout and, when the diaphragm is pressed by the thumb of the operator, the valve is unseated so that the material within the container is dispensed through the tubular valve stem and through the passage, to exit from the latter.

A structure, such as shown in my said Patent No. 2,753,214, has been the best on the market for the uses stated in said patent, but commercial use of this construction has shown that it is not the best way to dispense foam or any other aerosol material. The primary difficulty arises from the fact that, when the diaphragm is constructed as described, it must be very elastic because of its relatively small diameter for some valve stems require depression in excess of 1/16" in order to open the valve. With a diaphragm of such small diameter, considerable pressure is required and there is an ever-present possibility of fracturing the diaphragm in order to get the necessary amplitude of operation. I have concluded, as a result of wide experience with the use of diaphragms in aerosol dispensers, that they are not entirely satisfactory for the purposes stated.

The primary object of the present invention is to provide a highly efficient cap which will satisfactorily discharge foam or any other aerosol material without the employment of a diaphragm or button and which is capable of operation with aerosol valves irrespective of the degree to which such valve stems need to be depressed in order to properly function.

In its preferred commercial form, the cap of the present invention comprises a body portion adapted to be supported upon the cup of the container, but in lieu of the diaphragm or button heretofore used, this invention utilizes a pivoted tab positioned at the upper portion of the body of the cap and peripherally entirely free from the body except at one point in its circumference. On the under side of the cap is formed a chambered hub communicating with an outlet channel terminating in a spout juxtaposed with the single point of connection between the tab and the body of the cap. The chambered hub forms a close fitting socket for the upper end of the valve stem, so that, when the tab is depressed, the valve stem is operated to unseat the valve and permit the discharge of material in the container through the spout.

One advantage of the present invention is that it may be made as cheaply as the structure of my last mentioned prior patent, but is entirely free from the difficulties which have been experienced with caps of the diaphragm type.

Features of the invention, other than those adverted to, will be apparent from the hereinafter detailed description and appended claims, when read in conjunction with the accompanying drawing.

The accompanying drawing illustrates one practical embodiment of the invention, but the construction therein shown is to be understood as illustrative, only, and not as defining the limits of the invention.

Figure 1:
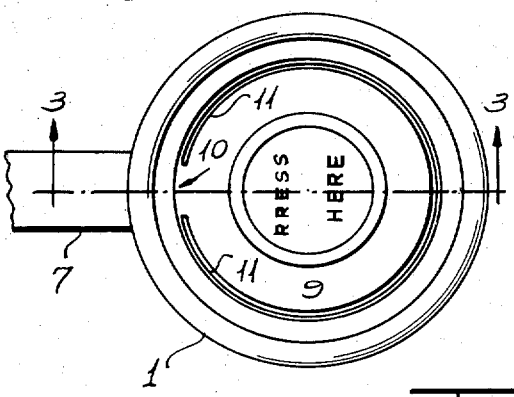
Fig. 1 is a plan view of the cap embodying the present invention.
Figure 2:
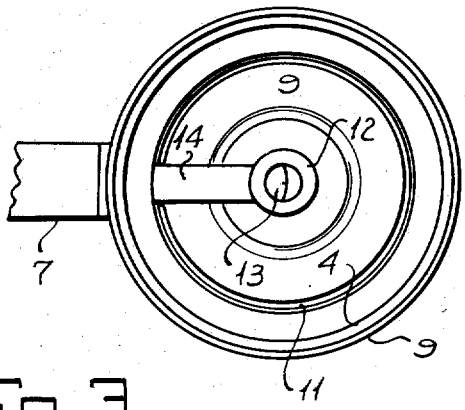
Fig. 2 is an underneath plan view of said cap.

As shown in the drawings, the cap comprises a body having a circular side wall 1, the lower portion of which is flared outwardly, as indicated at 2, and provided with an internal bead 3, so that the cap may be sprung over the peripheral edge of the cup 4 which acts as the closure for an open top container C. The cup 4 supports a valve housing 5 which houses a valve such, e. g., as shown in my Patent No. 2,631,814, with an upstanding tubular valve stem 6. The peripheral wall 1 is provided at one side thereof with a spout 7 which may be either long or short, depending upon the particular material which is to be dispensed. Ordinarily a short spout is used for the dispensing of foam, while longer spouts, such as shown in the drawing, are usually employed for the dispensing of liquids, such as concentrated coffee or other foods or beverages.

The cap is provided with a top opening 8 in which is positioned a tab 9. As best shown in Fig. 1, this tab is entirely free from attachment to the side wall 1 except for a relatively narrow hinge connection 10 and entirely around the remainder of the periphery of the cap there is formed an open slot 11 to permit free pivotal movement of the tab about the axis of its hinge connection 10. The under side of the tab 9 has an integral hub 12 provided therein with a chamber or socket 13 adapted to snugly fit over the upper end of the tubular valve stem 6.

A rib extends radially from the hub 12 to the side wall 1 directly beneath the hinge portion 10. Said rib is shown as integrally joined at its outer end to said side wall and is provided with an internal channel 15 which leads from the chamber 13 of the hub to the passage through the spout 7. The tab is preferably positioned slightly below the upper edge of the side wall 1, so that, if containers are stacked one above the other, each superimposed container will not bear upon the tab 9 and inadvertently open the valve thereof.

Figure 3:
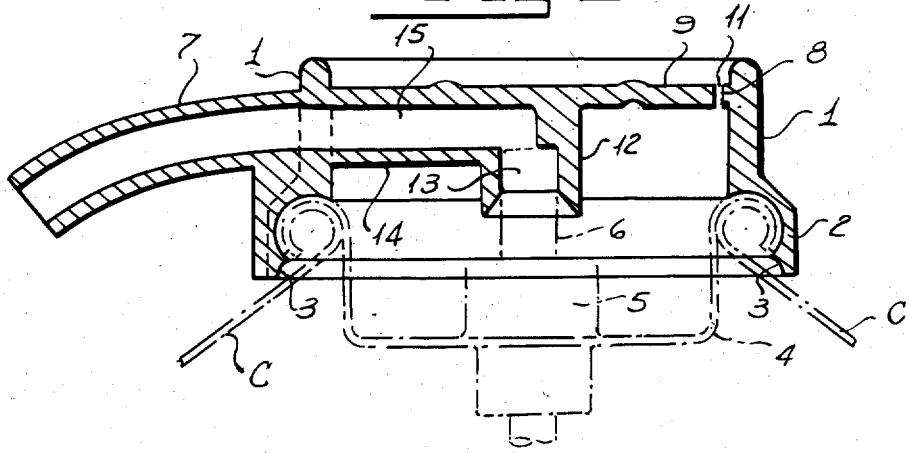
Fig. 3 is a section on the line 3—3 of Fig. 1 showing the parts in the position which they occupy when the valve is normally closed.
Figure 4:
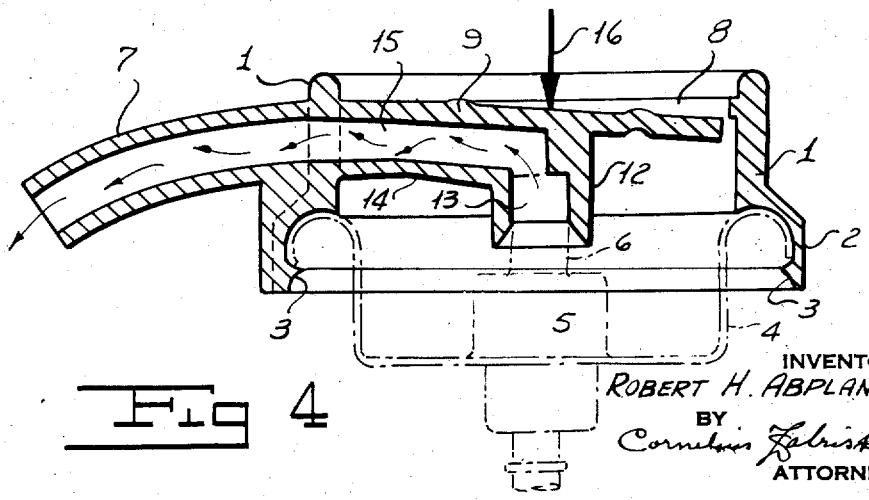
Fig. 4 is a section corresponding to Fig. 3, but showing the relation which the parts assume when the valve is in open condition to discharge the contents of the container.

In practice the parts normally partake of the position shown in Fig. 3, which corresponds to the closed valve condition of the dispenser. When it is desired to dispense material from the associated container, the tab is pressed downwardly by the finger or thumb of the operator, as indicated by the arrow 16 in Fig. 4. This depresses the valve stem 6, opens the valve and permits the exit of the contents of the container through the passage 15 and spout 7. As soon as the pressure on the tab is released the tab will spring back into the position shown in Fig. 3 and this movement will be accompanied by the closing of the valve.

The operation of the cap in the manner stated is made possible by the material from which the cap is constructed. This material must be of a fairly resilient, bendable nature and in practice it is preferably a plastic, such as polyethylene, or any other suitable polymer. These materials permit of bending of all parts of the cap as may be necessary for the performance of its functions. The tab should be made sturdy enough so that it will normally tend to occupy the position in Fig. 3, the assuming of which position is of course assisted by the spring with which aerosol valves are commonly equipped. The cap of the present invention, made of plastic as described, may be pressure molded according to conventional practice through the employment of appropriate dies, as will be well understood by those skilled in the pressure molding art.

I wish to call particular attention to the fact that the present invention embodies no diaphragm or button. Experience with the cap of this invention has shown that it entirely overcomes difficulties present in the diaphragm type of cap and constitutes a positively operable unit for actuating valves of widely different requirements of opening and closing movement and this is not so with diaphragm types of caps.

The foregoing detailed description sets forth the invention in its preferred practical forms, but the invention is to be understood as fully commensurate with the appended claims.

Having thus fully described the invention, what I claim as new and desire to secure by Letters Patent is:

1. A dispensing cap for aerosol containers having a tubular discharge valve stem comprising: an upstanding peripheral wall across the interior of which extends a valve operating tab attached for a short distance at its periphery to said wall to form a hinge portion therewith and otherwise unattached to the peripheral wall but extending closely adjacent thereto, a hub projecting from the inner side of said tab and chambered to form a socket for the tubular valve stem of an associated container, a rib extending from said hub to the side wall at the hinge portion and having therein a passage leading through said side wall, whereby pressure on the exterior of the tab may be utilized to operate the valve stem and unseat the valve for the discharge of the contents of the container through said passage.

2. A dispensing cap according to claim 1, wherein all parts of the cap are integral with one another.

3. A dispensing cap according to claim 1, wherein the cap is formed from resilient plastic.

4. A dispensing cap according to claim 1, wherein a hollow spout is formed on the side wall in a position to form a continuation of said passage.

*5. A dispensing cap for aerosol containers having a tubular discharge valve stem comprising: an upstanding peripheral wall across the interior of which extends a valve operating tab attached for a short distance at its periphery to said wall to form a hinge portion therewith and otherwise unattached to the peripheral wall but extending closely adjacent thereto, and a hub projecting from the inner side of said tab and chambered to form a socket for the tubular valve stem of an associated container, said chambered hub extending outwardly through said tab to form an outlet, whereby pressure on the exterior of the tab may be utilized to operate the valve stem and unseat the valve for the discharge of the contents of the container through said outlet.*

References Cited in the file of this patent or the original patent

UNITED STATES PATENTS

| | | |
|---|---|---|
| 2,545,991 | Cooper | Mar. 20, 1951 |
| 2,753,214 | Abplanalp | July 3, 1956 |